US 10,650,476 B2

(12) United States Patent
Bässler et al.

(10) Patent No.: US 10,650,476 B2
(45) Date of Patent: May 12, 2020

(54) ELECTRONIC DISCOVERY PROCESS USING A BLOCKCHAIN

(71) Applicant: International Business Machines Corporation, Armonk, NY (US)

(72) Inventors: Michael Bässler, Neckartenzlingen (DE); Thomas Hampp, Stuttgart (DE); Philipp Hoffmann, Hamburg (DE); David Lebutsch, Tuebingen (DE); Daniel Pittner, Steinenbronn (DE)

(73) Assignee: International Bussiness Machines Corporation, Armonk, NY (US)

( * ) Notice: Subject to any disclaimer, the term of this patent is extended or adjusted under 35 U.S.C. 154(b) by 347 days.

(21) Appl. No.: 15/824,044

(22) Filed: Nov. 28, 2017

(65) Prior Publication Data

US 2019/0164241 A1    May 30, 2019

(51) Int. Cl.
*G06Q 50/18* (2012.01)
*G06F 16/27* (2019.01)

(52) U.S. Cl.
CPC .............. *G06Q 50/18* (2013.01); *G06F 16/27* (2019.01)

(58) Field of Classification Search
CPC ........ G06Q 50/16; G06Q 50/01; G06F 16/27; G06F 16/219; G06F 16/285
USPC ....................................................... 707/736
See application file for complete search history.

(56) References Cited

U.S. PATENT DOCUMENTS

| 10,445,527 | B2 * | 10/2019 | Boehler | G06F 16/285 |
| 2016/0283920 | A1 | 9/2016 | Fisher et al. | |
| 2016/0344737 | A1 | 11/2016 | Anton et al. | |
| 2017/0041296 | A1 * | 2/2017 | Ford | H04W 12/02 |
| 2018/0005186 | A1 * | 1/2018 | Hunn | G06F 16/219 |
| 2019/0066230 | A1 * | 2/2019 | Dange | G06Q 50/01 |

OTHER PUBLICATIONS

David Piesses, Cyber Risk Mitigation with Blockchain, Source: 6th SOA Asia-Pacific Symposium; Publisher: Society of Actuaries, Aug. 30, 2016, NPL pp. 27, 45 and 73.
Sir Mark Walport, Distributed Ledger Technology: Beyond Block Chain, Publisher: www.gov.uk/go-science, pp. 5, 6, 56 and 59.

* cited by examiner

*Primary Examiner* — Dung K Chau

(57) ABSTRACT

The invention relates to a computer-implemented method for performing an electronic discovery process using a blockchain. For at least two of phases of the electronic discovery process individual electronic data processing tools are used for executing the respective phase. For each of the phases of the electronic discovery process metadata of the electronic data objects subject to the respective phase of the electronic discovery process and to the electronic data processing tool used for executing the respective phase are stored in the blockchain. Furthermore, audit information about auditable actions carried out during the respective phase by the electronic data processing tool used for executing the respective phase on the electronic data objects is stored in the blockchain. The stored audit information provides an end-to-end audit trail for each of the electronic data objects subject to at least one of the phases of the electronic discovery process.

20 Claims, 4 Drawing Sheets

ELECTRONIC DISCOVERY PROCESS USING A BLOCKCHAIN

FIELD

The present disclosure relates to the field of electronic data processing and, more specifically, to a computer-implemented method for performing an electronic discovery process for providing evidence in a form of electronic data objects.

BACKGROUND

Electronic discovery (eDiscovery) refers to discovery in legal proceedings such as litigation, government investigations, or Freedom of Information Act requests, where the information sought is in electronic format. A discovery is used as a pre-trial procedure in a lawsuit in which each party, through the law of civil procedure, can obtain evidence from the other party or parties. eDiscovery is subject to rules of civil procedure and agreed-upon processes, often involving review for privilege and relevance before data are turned over to the requesting party.

In the United States of America, electronic discovery e.g. was the subject of amendments to the Federal Rules of Civil Procedure (FRCP), effective Dec. 1, 2006, as amended to Dec. 1, 2015. In addition, US state law frequently addresses issues relating to electronic discovery as well. Furthermore, other jurisdictions around the world also have rules relating to electronic discovery as well.

In general, electronic information is considered different from paper information because of its intangible form, volume, transience and persistence. Electronic information may for example be more complex than information provided by paper documents due to its encoding. Furthermore, electronic information may have to be processed or even transformed in order to be made accessible. In view of the extent of electronic information generated and handled today, electronic information becoming more and more important as evidence. However, the aforementioned characteristics of electronic information create special challenges for electronic discoveries. Hence, there is a constant need to improve the performance of electronic discoveries.

SUMMARY

Various embodiments provide a method for performing an electronic discovery process for providing evidence in form of electronic data objects, a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a computer-implemented method for performing an electronic discovery process for providing evidence in form of electronic data objects using a blockchain. The electronic discovery process comprises a plurality of phases. For at least two of the phases individual electronic data processing tools are used for executing the respective phase. Each of the individual electronic data processing tools is dedicated to an individual one of the at least two phases. For each of the phases of the electronic discovery process metadata of the electronic data objects, which is subject to the respective phase of the electronic discovery process and to the electronic data processing tool used for executing the respective phase, is stored in the blockchain. Furthermore, audit information about auditable actions carried out during the respective phase by the electronic data processing tool used for executing the respective phase on the electronic data objects is stored in the blockchain. The stored audit information provides an end-to-end audit trail for each of the electronic data objects subject to at least one of the phases of the electronic discovery process.

In a further aspect, the invention relates to a computer program product comprising a non-volatile computer-readable storage medium having computer-readable program code embodied therewith. The computer-readable program code is configured to implement a method for performing an electronic discovery process for providing evidence in form of electronic data objects using a blockchain, when it is executed by a computer system. The electronic discovery process comprises a plurality of phases. For at least two of the phases individual electronic data processing tools are used for executing the respective phase. Each of the individual electronic data processing tools is dedicated to an individual one of the at least two phases. For each of the phases of the electronic discovery process metadata of the electronic data objects, which is subject to the respective phase of the electronic discovery process and to the electronic data processing tool used for executing the respective phase, is stored in the blockchain. Furthermore, audit information about auditable actions carried out during the respective phase by the electronic data processing tool used for executing the respective phase on the electronic data objects is stored in the blockchain. The stored audit information provides an end-to-end audit trail for each of the electronic data objects subject to at least one of the phases of the electronic discovery process.

In a further aspect, the invention relates to a computer system for performing an electronic discovery process for providing evidence in form of electronic data objects using a blockchain. The electronic discovery process comprises a plurality of phases. For at least two of the phases individual electronic data processing tools are used for executing the respective phase. Each of the individual electronic data processing tools is dedicated to an individual one of the at least two phases. The computer system is configured for each of the phases of the electronic discovery process to store in the blockchain metadata of the electronic data objects, which is subject to the respective phase of the electronic discovery process and to the electronic data processing tool used for executing the respective phase. Furthermore, the computer system is configured to store in the blockchain audit information about auditable actions carried out during the respective phase by the electronic data processing tool used for executing the respective phase on the electronic data objects. The stored audit information provides an end-to-end audit trail for each of the electronic data objects subject to at least one of the phases of the electronic discovery process.

A computer-implemented method for performing an electronic discovery process for providing evidence in form of electronic data objects using a blockchain, the electronic discovery process comprising a plurality of phases and for at least two of the phases individual electronic data processing tools being used for executing the respective phase, each of the individual electronic data processing tools being dedicated to an individual one of the at least two phases, the method comprising for each of the phases of the electronic discovery process storing metadata of the electronic data objects being subject to the respective phase of the electronic discovery process and to the electronic data processing tool used for executing the respective phase in the blockchain, storing audit information about auditable actions carried out during the respective phase by the electronic data processing tool used for executing the respective phase on the electronic data objects in the blockchain, the stored audit information providing an end-to-end audit trail for each of the electronic data objects subject to at least one of the phases of the electronic discovery process.

A computer program product comprising a non-volatile computer-readable storage medium having computer-readable program code embodied therewith, the computer-readable program code being configured to implement the following for each phase of an electronic discovery process for providing evidence in form of electronic data objects using a blockchain, the electronic discovery process comprising a plurality of the phases and for at least two of the phases individual electronic data processing tools being used for executing the respective phase, each of the individual electronic data processing tools being dedicated to an individual one of the at least two phases, when being executed by a computer system storing metadata of the electronic data objects being subject to the respective phase of the electronic discovery process and to the electronic data processing tool used for executing the respective phase in the blockchain, storing audit information about auditable actions carried out during the respective phase by the electronic data processing tool used for executing the respective phase on the electronic data objects in the blockchain, the stored audit information providing an end-to-end audit trail for each of the electronic data objects subject to at least one of the phases of the electronic discovery process.

A computer system for performing an electronic discovery process for providing evidence in form of electronic data objects using a blockchain, the electronic discovery process comprising a plurality of phases and for at least two of the phases individual electronic data processing tools being used for executing the respective phase, each of the individual electronic data processing tools being dedicated to an individual one of the at least two phases, the computer system being configured for each of the phases of the electronic discovery process to store metadata of the electronic data objects being subject to the respective phase of the electronic discovery process and to the electronic data processing tool used for executing the respective phase in the blockchain, store audit information about auditable actions carried out during the respective phase by the electronic data processing tool used for executing the respective phase on the electronic data objects in the blockchain, the stored audit information providing an end-to-end audit trail for each of the electronic data objects subject to at least one of the phases of the electronic discovery process.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
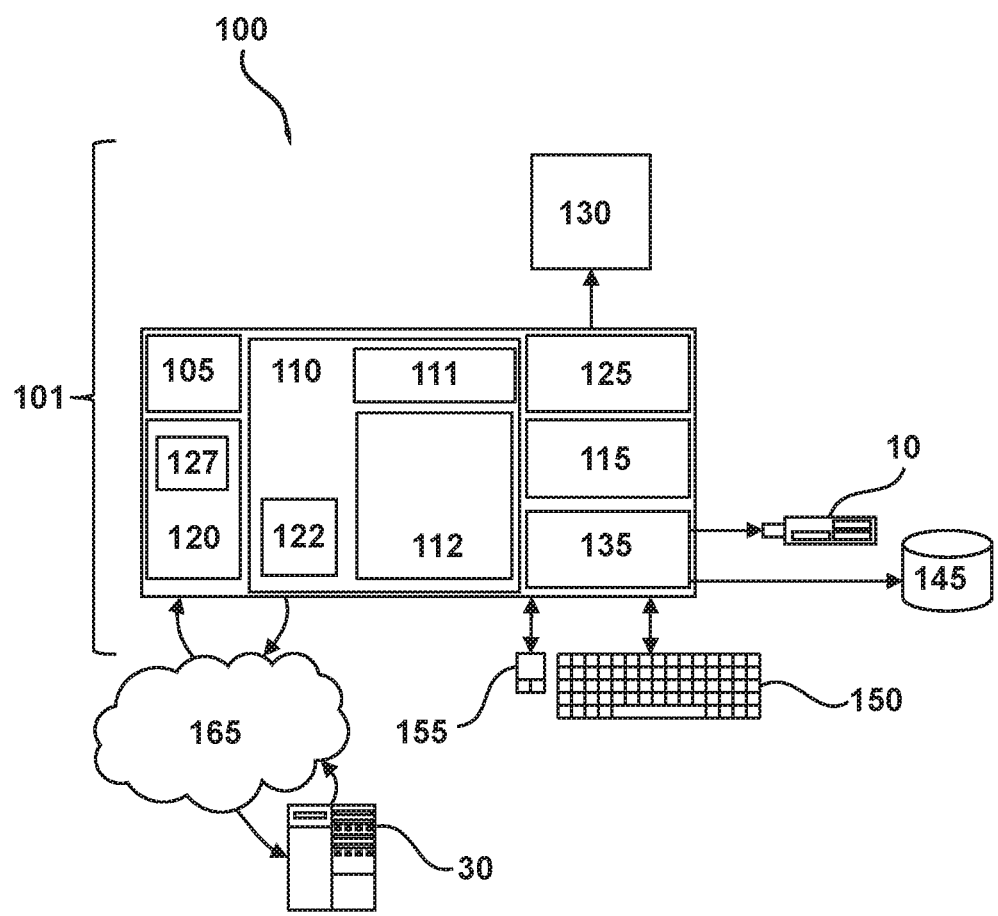
FIG. 1 depicts an exemplary computer system suited for implementing one or more embodiments as involved in the present disclosure.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing end-to-end auditing and lineage of information processed in form of electronic data objects. Electronic data objects may refer to data objects created, manipulated, communicated, stored, and/or utilized in an electronic format, i.e. in digital form, requiring the use of computer hardware and software. Electronic data processing tools may refer to data processing tools for created, manipulated, communicated, stored, and/or utilizing electronic data objects. Electronic data processing tools may be implemented in software, firmware and/or hardware. An individual electronic data processing tool may be provided by an individual computer system or it may be distributed over a plurality of computer systems. According to embodiments, a computer system may provide more than one electronic data processing tool. According to embodiments, one or more of the electronic data processing tools may be provided by the blockchain comprising computer-readable program code. An execution of the respective computer-readable program code by a processor of a computer system may cause the processor to control the computer system to perform one of the phases of the eDiscovery.

Audit information refers to information about the auditable actions carried out by the electronic data processing tools. Thus, the audit information enables an auditing of the eDiscovery process, i.e. an evaluation of the correctness, reliability and completeness of the eDiscovery performed. An audit trail, also called audit log, is a security-relevant chronological record, set of records, and/or destination and source of records that provide documentary evidence of the sequence of activities that have affected at any time the electronic data objects, which are subjects to the eDiscovery process. An end-to-end audit trail refers to an audit trail tracking all actions carried out on electronic data objects from the first activity, i.e. the input of the respective electronic data object into the eDiscovery process, to the last activity, i.e. the output of the respective electronic data object from the eDiscovery process. The first activity may for example be the identification of the respective electronic data object during an identification phase of the eDiscovery process. The last activity may for example be the delivery of the respective electronic data object during a production phase of the eDiscovery process. Between the first and last activity, a plurality of additional activities may be carried out on the respective electronic data object, including transformations of the same, and recorded by the end-to-end audit trail. An end-to-end audit trail may have the advantage, that it provides a full record of the actions carried out on the respective electronic data objects. Thus, it may be checked using the end-to-end audit trail that electronic data object has been properly handled by the eDiscovery process and e.g. not lost or forgotten.

According to embodiments, an audit is performed using the end-to-end audit trail for each of the electronic data objects provided by the blockchain. Based on the end-to-end audit for each of the electronic data object it may be checked that they have been properly handled.

eDiscovery is a large and complex process which usually spans over multiple parties, even in the simplest case. In general, each dispute involves at least five parties: plaintiff, defendant, respective lawyers of plaintiff and defendant as well as a judge. Efforts have been undertaken to standardize eDiscovery processes and to improve their efficiency as well as their effectiveness. The eDiscovery processes may e.g. be organized according to the Electronic Discovery Reference Model (EDRM). The EDRM represents a conceptual model of an e-discovery process mapping out different phases of an eDiscovery process.

An eDiscovery process may be scattered across a large set of electronic data processing tools, computer systems and participants contributing to the eDiscovery. Different electronic data processing tools may be used for different phases of the process. For example, specific tasks comprised by one of the phases may be delegated to one or more a specialist providing certain steps of the eDiscovery as a specialized service.

Due to the very nature of eDiscovery, in particular due to nature of its subjects, i.e. the electronic data objects, eDiscovery in contrast to traditional discovery may comprises a transformation of the electronic data objects handled. For example, a written letter which is an evidence may be audited as part of traditional litigation using a flawless audit trail, but the letter would not be transformed into another format, nor would it be added to a bundle of letters, which may be added to another bundle.

Unlike a simple one to one mapping of all electronic data objects used in the eDiscovery process, embodiments may rather allow performing an audit on the complete graph of electronic data objects that make up the eDiscovery process. In particular, a consistent audit trail may be provided even in case of transformations of electronic data objects. An email may for example be collected from a mail server as an NSF-file by an electronic data processing tools, in response to one of the recipients of the email being deemed relevant for the eDiscovery process. The NSF format may be rendered as an PDF by a second electronic data processing tools, reviewed in a third electronic data processing tools and finally produced as PST-file for sending it to court by a fourth electronic data processing tools.

Embodiments may use a blockchain to secure the end-to-end audit trail for all the electronic data processing tools and participants participating in the eDiscovery process. This may be achieved by not only documenting metadata in the blockchain, i.e. documenting which electronic data objects have been processed, but also audit information identifying the actions carried out on the respective electronic data objects as well as the resulting lineages. Embodiments may thus allow for tracking the lifecycle of a complete eDiscovery process, irrespectively of the electronic data processing tools used and including all content derived from the initial data. For example, it may be guaranteed that the aforementioned email has not been altered or lost in the process.

Embodiments may implement consistent means to manage data throughout the whole lifecycle of an eDiscovery case using the blockchain. The blockchain may provide such a data management in a tamper proof manner which may effectively restrict the possible success of manipulation attempts.

The present approach based on a blockchain may be beneficial compared to a simple exchange of data during an eDiscovery lifecycle by messages send via application programming interfaces, in case participants need to share information. Such a simple exchange of data may not be reliable. In case either system in the API connection goes out of sync, it may become problematic to reconcile the out of sync systems. Such a desynchronization may result in a plurality of different data processing histories. The present approach based on a blockchain may further be beneficial compared to a shared intermediary cloud service providing a trusted intermediary instance. In such arrangement, each participant of the eDiscovery may interact with the trusted intermediary instance, rather than directly with the other participants. The trusted intermediary instance holds a master copy of the data processing history. However, even in case of an intermediary instance with master copy the problem of a possible desynchronization of a participant's own internally hosted copy of the data processing history with the, e.g. cloud hosted, mater copy of the data processing history may still exist. Using a blockchain, which provides a distributed, decentralized data storage structure, wherein a plurality of copies of the blockchain are stored on a plurality of independent computer systems, the risk of a data loss may be minimized. Furthermore, an efficient way of synchronizing may be provided generating additional blocks of the blockchain based on a consensus of all participants participating in the generation of additional blocks.

A blockchain refers to a register comprising a list of records, so called blocks, which are linked and secured using cryptography. Each block may comprise a hash pointer as a link to a previous block, a timestamp identifying the time of generation of the respective block and data stored in the respective block. By design, blockchains may be inherently resistant to modification of the data stored in the blocks. A blockchain may serve as an open, distributed database that can record data efficiently and in a verifiable and permanent way. For use as a distributed register, a blockchain is e.g. managed by a peer-to-peer network collectively adhering to a protocol for validating additional blocks to be added to the blockchain. Once recorded, the data in any given block cannot be altered retroactively without the alteration of all subsequent blocks, which needs a collusion of the network majority.

A blockchain database may consists of two kinds of records: stored data and blocks. The blocks hold the stored data that is hashed and may e.g. be encoded into a Merkle tree. Each block may include the hash of the prior block in the blockchain, linking these two blocks. The linked blocks may form a chain. This iterative process may confirm the integrity of the previous block, all the way back to the first block of the blockchain, the so-called genesis block.

Blocks of a blockchain may also comprise executable program instructions, also referred to as smart contracts. The respective program instructions may be executed by a processor of a computer system in order to add an additional entry to the blockchain or in order to access information stored in the blockchain or in order to perform some other task defined by the blockchain. Providing executable program instructions using a blockchain may have the beneficial effect that the executable program instructions may be cryptographically secured against manipulation. Furthermore, the a distributed blockchain may provide an efficient way of distributing the respective program instructions. The executable program instructions may be verifiable, signed, and encoded in a programming language.

A blockchains may be secure by design and provide a distributed computing system with high Byzantine fault tolerance achieving a decentralized consensus.

According to embodiments, the blockchain may be shared among the participants of the eDiscovery. The blockchain may be replicated such that each of the participant has a copy of the blockchain. It may be managed by a peer-to-peer network collectively adhering to a protocol for validating additional blocks to be added to the blockchain. Thus, the blockchain may have the beneficial effect of providing a tamper proof and shared infrastructure.

A consensus of the participants may be required for adding an additional entry to the blockchain. All participants may agree to the entry and validate it via the peer-to-peer network. According to embodiments, rules may be established to validate entries. These rules may for example be implemented by executable program instructions comprised by the blockchain itself. Embodiments may have the beneficial effect of enabling commitments with low workload based on a trusted and trustless participation. Entries may be encrypted, hashed, and sent to a network of validating nodes. According to embodiments, the validation nodes may be provided by additional computer systems or by the computer systems used by the participants of the eDiscovery.

According to embodiments, for each of the electronic data processing tools the method further comprises storing results of the execution of the respective electronic data processing tools in the blockchain. Embodiments may have the beneficial effect of not only providing audit information about actions carried out on the electronic data objects, but also providing the results of these actions. Thus, in case part of the eDiscovery process has to be repeated, it may not be required to restart the entire eDiscovery process, but rather only repeat the respective part of the eDiscovery process starting with a sufficient set of results provided via the blockchain.

According to embodiments, the storing of the results comprises storing resulting electronic data objects or references to the respective resulting electronic data objects in the blockchain. According to embodiments, the method further comprises for each phase of the electronic discovery process preceded by another one of the phases of the electronic discovery process accessing at the beginning of the respective phase the results of the respective preceding phase provided in the blockchain. Embodiments may have the beneficial effect of ensuring integrity of the overall process and processing of all relevant data objects. Furthermore, it may be checked using the blockchain that no results are getting lost by a transition from one phase of the eDiscovery process to another phase.

According to embodiments, the blockchain provides a data processing lineage for each of the electronic data objects. Embodiments may have the beneficial effect of proving integrity of the overall process and processing of all relevant data objects.

According to embodiments, for each of the phases of the electronic discovery process an individual electronic data processing tool is used and each of the electronic data processing tools is dedicated to an individual one of the phases. Embodiments may have the beneficial effect of allowing a use of dedicated individual electronic data processing tools for each phase in the eDiscovery process. Furthermore, they may have the beneficial effect of allowing outsourcing of individual phases of the eDiscovery process to specialists using specialist electronic data processing tools.

According to embodiments, the blockchain comprises computer-readable program code. Execution of the computer-readable program code by one of the individual electronic data processing tools causes the individual electronic data processing tool to store the audit information about auditable actions carried out by the respective individual electronic data processing tool in the blockchain.

According to embodiments, the blockchain comprises computer-readable program code. Execution of the computer-readable program code by one of the individual electronic data processing tools causes the individual electronic data processing tool to store the metadata of the electronic data objects being subject to the respective electronic individual data processing tool in the blockchain.

According to embodiments, each of the data and information stored in the blockchain is assigned with a timestamp. Embodiments may have the beneficial effect of enabling to determine for each data and information the point of time they became visible for the eDiscovery process, i.e. have been taken into account and/or performed.

According to embodiments, each of the electronic data processing tool checks the blockchain for new entries, while being executed. Embodiments may have the beneficial effect of enabling electronic data processing tool recognize e.g. amendments of the scope of the eDiscovery process and react correspondingly.

According a requirement for a cross-electronic data processing tool notification based on auditable actions documented in the blockchain is determined. In response to determining the respective requirement, the cross-electronic data processing tool notification is initiated.

The blockchain may have the beneficial effect of implementing cross-electronic data processing tool workflows even in case different electronic data processing tools are used by different participants for different phases of the eDiscovery. Embodiments may thus allow cross-notification easing re-conciliation across the eDiscovery process. For example, it may be assumed that during review, it is discovered that a relevant person had another name at an earlier point in time to be covered by eDiscovery, e.g. because of a name change during marriage. In this case, thus the process eDiscovery needs to be re-iterated additionally taking into account the other name. However, a full re-iteration of the whole process, in order to ensure consistency and completeness, may cause significant additional workload and be error prone. According to embodiments, cases like the one described above may be tracked and handled automatically, without requiring a full re-iteration of the whole process, in order to ensure consistency and completeness. Thus, the required workload as well as the remaining risks may efficiently be minimized.

According to embodiments, the metadata of the electronic data objects stored in the blockchain comprises at least one of the following: name, hash, signature and locator of the respective electronic data object.

According to embodiments, the metadata further comprises a download address from which the respective electronic data object can be downloaded. Embodiments may have the beneficial effect each participant participating in the eDiscovery process is enabled to access the electronic data objects being subject of the eDiscovery process. According to embodiments, the access to the electronic data object via the download address is cryptographically restricted. eDiscovery may be subject to rules of civil procedure and agreed-upon processes, often involving review for privilege and relevance before data is turned over to the requesting party. The restriction of access to the electronic data object via the download address may enable a management of access rights the electronic data objects ensuring that only authorized participants may access the respective electronic data objects.

According to embodiments, the audit information about auditable actions carried on the electronic data objects comprising at least one of the following: creation, modification, and deletion of the respective electronic data object.

According to embodiments, the electronic data objects comprise at least one of the following: email, instant message, text document, drawing, graph, chart, photograph, sound recording, video recording.

According to embodiments, read access to data and information assigned to a group of the electronic data objects and stored in the blockchain is cryptographically restricted. Embodiments may have the beneficial effect that the blockchain may be used as a complete database for recording all the electronic data objects handled during the eDiscovery process as well as all the actions carried out on the respective electronic data objects, while electronic data objects which are confidential e.g. due to a privilege, may be prevented from becoming publicly available by restricting read access to the respective electronic data objects to the holders of the respective privilege. Thus, each participant of the eDiscovery may only see appropriate entries, even though a distributed blockchain is used. Embodiments may enable delegation and revocation of access to all or parts of the data being subject of the eDiscovery process.

According to embodiments, the blockchain comprises a definition of the scope of the electronic discovery process. An amendment of the scope of the electronic discovery requires an approval by each of the parties involved in the electronic discovery process. Embodiments may have the beneficial effect that a definition of scope of the electronic discovery may be provided in a temper proof fashion.

According to embodiments, the electronic discovery process comprises the phases of identification, preservation, collection, processing, review, analysis, and production of the electronic data objects. Identification may comprise locating of potential sources of electronic data objects relevant for the electronic discovery, i.e. comprised by the predefined scope of the electronic discovery. Furthermore, identification may comprise determining the scopes of the potential sources located. Preservation may comprise protecting the electronic data objects comprised by the potential sources against inappropriate alteration and destruction. Collection may comprise gathering of the electronic data objects for further use in the e-discovery process. Processing may comprise reducing the volume of electronic data objects and converting the electronic data objects, if necessary, to forms more suitable for review and analysis. Review may comprise evaluating of electronic data objects for relevance and privilege. Analysis may comprise evaluating of electronic data objects for content and context, including key patterns, topics, people and discussion. Production may comprise delivering the electronic data objects to others in appropriate formats using appropriate delivery mechanisms.

Embodiments may have the beneficial effect that an efficient, effective and reliable eDiscovery process may be implemented. Embodiments may further have the beneficial effect that production of the electronic data objects may be implemented by the blockchain itself comprising download addresses for downloading the respective electronic data objects.

According to embodiments, blockchain is distributed over a plurality of computer systems of participants of the electronic discovery process, each of the computer systems storing a copy of the blockchain. Embodiments may have the beneficial effect that each of the participants has access to the end-to-end audit trails provided by the blockchain. In particular, information about the actions carried out during different phases of the eDiscovery processes by different electronic data processing tools may efficiently be shared and/or the respective actions may effectively be coordinated.

According to embodiments, the computer-readable program code further is configured to implement any of embodiments of the method for performing an electronic discovery process for providing evidence in form of electronic data objects descript herein. According to embodiments, the computer system further is configured to execute any of the embodiments of the method for performing an electronic discovery process for providing evidence in form of electronic data objects descript herein.

FIG. 1 depicts a computer system 100 suited for implementing a method for performing an electronic discovery process for providing evidence in form of electronic data objects using a blockchain. In particular, the computer system 100 may comprise one or more electronic data processing tools, e.g. in form of software, firmware or hardware, and execute one or more phases of the eDiscovery process. According to embodiments, the computer system 100 may comprise an individual electronic data processing tool dedicated to an individual phase of the eDiscovery process. In this case the computer system 100 may exclusively execute the respective individual phases of the eDiscovery process. According to embodiments, a plurality of computer systems 100 is provided, each of the computer systems 100 configured to execute a different phase of the eDiscovery process.

Furthermore, the computer system 100 may be configured for performing an auditing of the eDiscovery process using the end-to-end audit trails provided by the blockchain.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112, e.g. implementing an individual electronic data processing tool. The individual electronic data processing tool may be configured to execute on or more, e.g. precisely one, phase of the eDiscovery process.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. The software 112 may e.g. implement a method for performing an electronic discovery process for providing evidence in form of electronic data objects using a blockchain. It may e.g. an individual electronic data processing tool configured to execute on or more, e.g. precisely one, phase of the eDiscovery process. When a source program, then the program needs to be translated via a compiler, assembler, interpreter, or the like, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. The network 165 may e.g. enabling cross-electronic data processing tool communication between an individual electronic data processing tool provided by the computer system 100 and a further individual electronic data processing tool provided by the external system 30. According to embodiments, the network 165 may be used to manage the blockchain, in particular to add additional blocks to the blockchain. According to embodiments, the network 165 may for example comprise a peer-to-peer network collectively adhering to a protocol for validating additional blocks.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage. Storage 120 may further comprise a copy of the blockchain 123.

Figure 2:
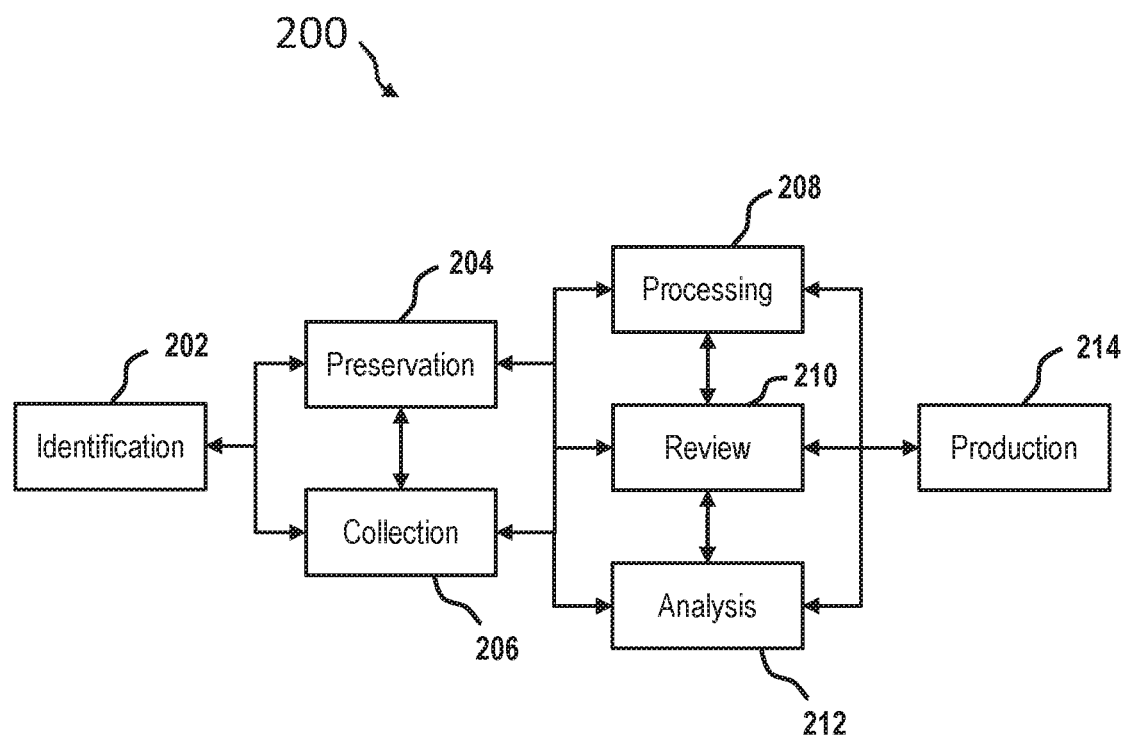
FIG. 2 depicts a schematic flow diagram of an exemplary electronic discovery process for providing evidence.

FIG. 2 depicts a schematic flow diagram of an exemplary eDiscovery process 200. The eDiscovery comprises the phases of identification 202, preservation 204, collection 206, processing 208, review 210, analysis 212, and production 214 of the electronic data objects. All the phases 202-214 eDiscovery process 200 may be carried out in the order presented in FIG. 2 or not all, but rather a selection of the phases 202-214 may be carried out. According to embodiments, the phases 202-214 may be carry out in a different order. Furthermore, individual phases 202-214 may be performed numerous times honing in on a more precise set of results. Furthermore, earlier phases may be repeated in order to refining the approach based on a better understanding of the electronic data objects comprised by the scope of the eDiscovery process 200 or as the nature of the matter changes, e.g. scope of the eDiscovery process 200. Thus, one or more phases 202-214 of the eDiscovery process 200 or the entire eDiscovery process 200 may be performed iterative. This is indicated by the double arrows used. There are phases like preservation 204 and collection 206 as well as processing 208, review 210, and analysis 212, which are strongly dependent on each other and which may be performed parallel and/or iteratively mutually taking into account the results of the respective phases. This relation is indicated by arranging the respective phases above each other in FIG. 2.

The basis of the eDiscovery 200 may be information governance, which may comprise a set of multi-disciplinary structures, policies, procedures, processes and controls implemented to manage information at an enterprise level, supporting an organization's immediate and future regulatory, legal, risk, environmental and operational requirements. Information governance may provide a balance between extracting value from information and reducing the potential risk of information, e.g. organizational risks in the fields of compliance, operational transparency, and reducing expenditures associated with e-discovery and litigation response. For this purpose, an organization may establish a consistent and logical framework for employees to handle data through their information governance policies and procedures. These policies and procedures may guide proper behavior regarding how organizations and their employees handle electronic data objects.

Each of the phases 202-214 of the eDiscovery 200 may be performed using an individual electronic data processing tool, like e.g. software, firmware or hardware module. Each of the electronic data processing tools may be dedicated to an individual one of the phases 202-214. According to embodiment each of the phases 202-214 of the eDiscovery 200 may be performed by an individual computer system. According to alternative embodiments one or more of the phases 202-214 may be performed by the same electronic data processing tools, while for at least two of the phases 202-214 still individual electronic data processing tools are used.

During identification 202 electronic data objects, like e.g. emails, potentially responsive to relevant questions specified by the scope of the eDiscovery 200 are identified for further analysis and review. Custodians who are in possession of potentially relevant electronic data objects may be identified. To ensure a complete identification of data sources comprising relevant electronic data objects, data mapping techniques may be employed. Since the scope of data sources, i.e. the volume of electronic data objects, may be overwhelming in this phase, attempts may be made to reduce the overall scope of data sources during this phase. This may be achieved e.g. by limiting the identification of electronic data objects to a certain date range or search term(s).

During preservation 204 electronic data objects identified as potentially relevant during identification 202 are protected against possible data spoliation or destruction in order to ensure that no electronic data objects get corrupted.

Collection 206 may comprise a transfer of the electronic data objects from a company to their legal counsel, who may determine relevance and disposition of the respective electronic data objects. Some companies may have electronic data processing tools in place to quickly place legal holds on certain custodians, when an event, such as legal notice, is triggered and begin the collection process immediately. In other cases, a digital forensics expert may be needed to be called in to prevent the spoliation of data. The size and scale of this collection is determined by the identification.

During the processing phase 208, native files, i.e. user-created electronic data objects, are prepared to be loaded into an electronic data object review platform. The processing phase 208 may comprise an extraction of text and metadata from the native files. Various data culling techniques may be employed during this phase, such as deduplication and deNISTing, in order reduce the volume of electronic data objects. DeNISTing is a commonly used method of reducing the number of documents subject to attorney or computer review by removing file types that are highly unlikely to have evidentiary value. The term deNISTing refers to the National Institute of Standards and Technology (NIST), since the process of deNISTing is based on a list of file types maintained by this agency. This list is part of the National Software Reference Library Project. An electronic data processing tool executing a deNISTing of the electronic data objects, the electronic data processing tool compares all the electronic data objects stored in the collection generated in phase 206 against the National Software Reference Library list and removes electronic data objects matching those on the list unlikely to contain relevant information. Processing may further comprise converting native files to formats, such as PDF or TIFF, which may allow for easier redaction and bates-labeling. The electronic data processing tool performing the processing 208 tools may furthermore employ advanced analytic tools to support a more accurate identification of potentially relevant electronic data objects during review 210.

During the review phase 210, electronic data objects are reviewed for responsiveness to eDiscovery requests and for privilege defined by the scope of eDiscovery 200. Different electronic data objects review platforms may provide assistance for fast identification of potentially relevant electronic data objects and culling of electronic data objects according to various criteria, such as keyword, date range, etc. The electronic data processing tool used for performing phase 210 may enable large groups of reviewers to work on cases, featuring collaborative organization of the review process and rearrange electronic data objects in batches to speed up the review process and eliminate work duplication.

During the analysis phase 212, the relevant electronic data objects identified by the review 210 are evaluated for their content as well as their context. The electronic data processing tool used for evaluating content and context of the relevant electronic data objects may e.g. search for specific use key patterns, topics, people and/or discussions.

During production 212, the electronic data objects are turned over to a requesting party, such as an opposing counsel or court, based on agreed-upon specifications which may be provided by the scope of the eDiscovery 200. The production may be accompanied by a load file, which is used to load electronic data objects into a review platform. According to embodiments a download address for downloading the electronic data objects or a respective load file comprising the download address may be provided by the blockchain. Electronic data objects can may be produced either as native files or in a format better suited for further handling, like PDF or TIFF.

Figure 3:
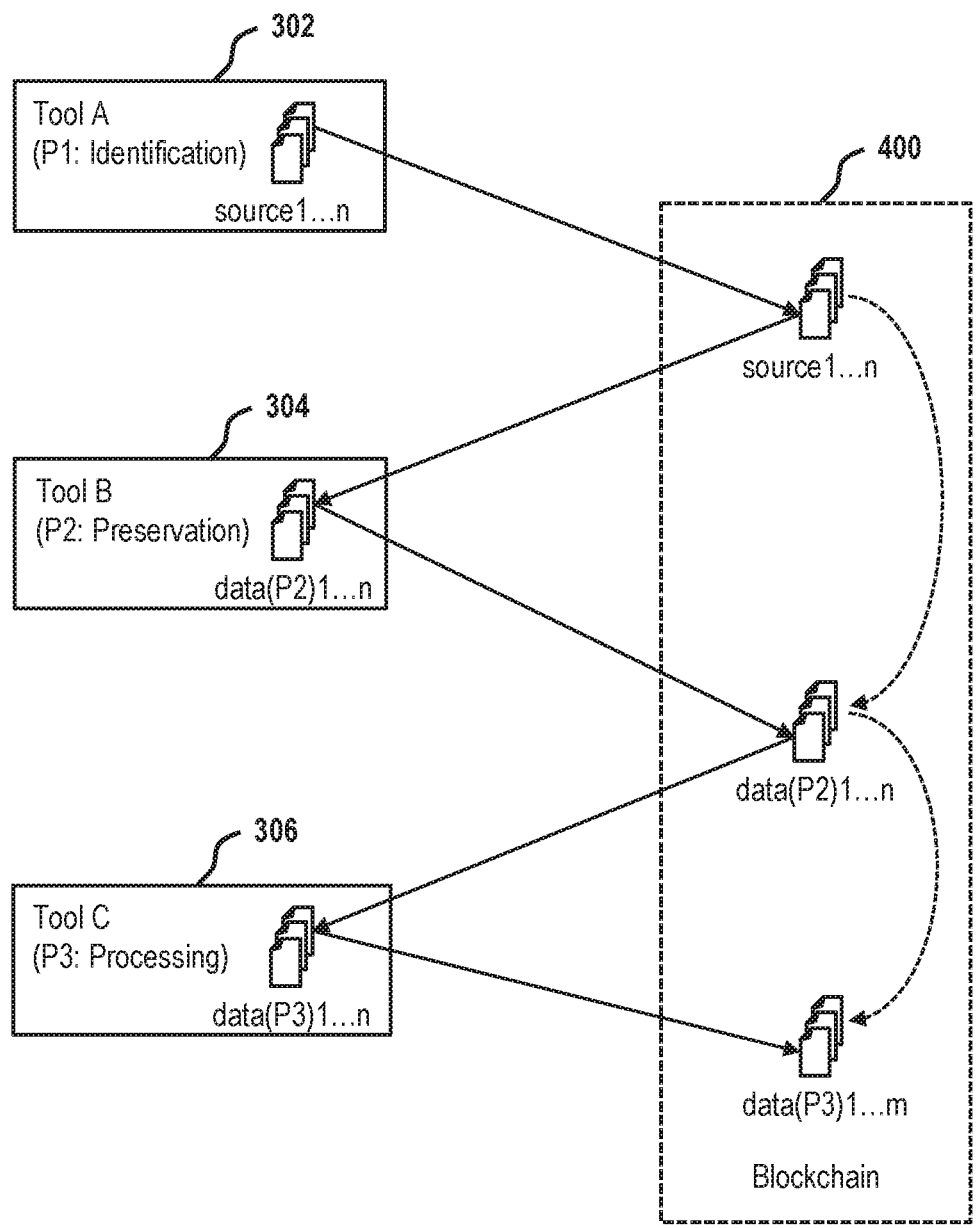
FIG. 3 depicts a schematic flow diagram of an exemplary electronic discovery process for providing evidence.

FIG. 3 depicts a further schematic flow diagram of an exemplary eDiscovery process 200. In FIG. 3, part of the eDiscovery process 200 of FIG. 2 is shown in more detail. To be more precise, identification (P1), preservation (P2), and processing (P3) are shown. Embodiments may have the beneficial effect that throughout the eDiscovery process, artifacts are collected, filtered, analyzed, transformed and created.

For example, a first individual electronic data processing tool A 302 may execute the identification. Tool A 302 identifies all potential sources source1 . . . n that are to be part of a case according to the scope of the eDiscovery process 200. The source1 . . . n may comprise a plurality of electronic data objects relevant for the eDiscovery process 200. It may further provide status reporting throughout the eDiscovery process 200 and auditing for the eDiscovery process 200. A second individual electronic data processing tool B 304 uses the potential sources source1 . . . n that are identified by the toll A 302. Tool A 302 and tool B 304 may be provided by different computer systems. Tool B 304 may further ensure that relevant electronic data objects data(P2)1 . . . n are preserved by preventing destruction and pro-actively preserving the same, e.g. creating copies. For example, backup copies are generated. Furthermore, the second tool A 302 may e.g. provide auditing for the eDiscovery process. A third individual electronic data processing tool C 306 may use the electronic data objects data(P2)1 . . . n resulting from the preservation and ensure that the set of electronic data objects data(P2)1 . . . n is normalized according to a normalization process aiming to reduce the amount electronic data objects data(P2)1 . . . n via selection resulting in a reduced set of electronic data objects data(P3)1 . . . m, with m≤n. Furthermore, the third tool C 306 may e.g. provide auditing for the eDiscovery process.

Embodiments may have the beneficial effect of allowing for auditing across electronic data processing tools, e.g. providing details about actions spanning over multiple electronic data processing tools, in particular multiple individual electronic data processing tools. For example, audit information may be stored in the blockchain, indicating whether all electronic data objects data(P2)1 . . . n are normalized by tool C 306 or whether one or more specific electronic data objects preserved by tool B 304 have not been normalized by tool C 306. Further, audit information may be provided about which electronic data object identified by tool A 302 caused an electronic data object to be normalized by tool C 306.

Embodiments may provide the beneficial effect that via the blockchain 400 the different electronic data processing tools 302-306 may link internal audit information to other electronic data processing tools 302-306. The blockchain 400 may provide a links between the electronic data processing tools 302-306 as well as identify the relations of electronic data objects on which different electronic data processing tools 302-306 work to their phase/domain expertise, e.g. the relations between source1 . . . n, data(P2)1 . . . n, and data(P3)1 . . . m. All electronic data processing tools 302-306, which are participating in or contributing to the eDiscovery process, may contribute t audit information about their actions to blockchain 400. Thus, all electronic data objects handled by the eDiscovery process may form a graph like structure which is described by the metadata and audit information stored in the blockchain 400 allowing for a tamper proof audit trail that spans across all electronic data processing tools 302-306 of the eDiscovery process. For reasons like size, it may be unpractical to store a complete electronic data objects inside the blockchain 400. Therefore, e.g. metadata and audit information comprising download addresses of the electronic data objects may be stored in the blockchain 400.

Embodiments may have the beneficial effect of enabling a production of an end-to-end audit trail as well as to link the different phase specific workflows that are implemented inside individual electronic data processing tools 302-306 used for the eDiscovery. Based on the proposed concept, one electronic data processing tool may leverage the information to provide cross-electronic data processing tool synchronization and overall status tracking. For example, assuming electronic data processing tool A 302 identifies an additional source (source n+1) after the identified sources source 1 . . . n have already been sent to tool B 304 or assuming a source is removed later on, since has been added in error. According to embodiments, the tool B 304 checking the blockchain may detect that there is a new revision for the present case and act accordingly. Eventually the change may be cascaded further down to tool C 306 after processing of the change has been completed by tool B 304 and recorded to the blockchain 400. This may e.g. be monitored and tracked from tool A 302 which gains insight into the progress of the case in the phases of tool B 304 and tool C 306 from the data in the blockchain 400.

It may be noted that according to embodiment all interaction with data stored in the blockchain 400 happens through chaincode, e.g. executable instructions, comprised by the blockchain 400, which may mean interacting with an API rather than sharing data structures.

When tool A 302 starts a new eDiscovery process, it may invoke executable instructions comprised by one or more entries of the blockchain 400 and create the initiate new eDiscovery process as a new record. This record may consist of metadata about the eDiscovery process, like e.g. it's scope, as well as a resource location, like e.g. an URL, that allows for locating and opening the electronic data objects handled in the context of the application of tool A 302.

When an auditable action, like e.g. creation, modification or deflection, of a potential source associated with the eDiscovery process is performed in the context of tool A 302, tool A 302 may invoke executable instructions comprised by the blockchain 400 to add audit information to the audit recorded by blockchain 400 for the present eDiscovery process.

By executing a phase specific workflow in tool A 302, a participant of the eDiscovery process may create potential sources source1 . . . n associated with the eDiscovery process. These sources source1 . . . n may be stored in the blockchain 400 too. Either completely or as a reference, so that other tools 304, 306 are enabled to retrieve the sources source1 . . . n using the blockchain 400.

At the point, where the eDiscovery process phase executed by tool A 302 is completed, blockchain 400 may contain a data structure that re-ensembles the eDiscovery process and all associated potential sources source1 . . . n.

Tool B 304 may as well be configured, to invoke executable instructions comprised by the blockchain 400 to add audit information to the audit recorded by blockchain 400 for the present eDiscovery process, when an auditable action, like e.g. creation, modification or deflection, of an electronic data object associated with the eDiscovery process is performed in the context of tool B 304.

When the same or another participant wants to proceed with the preservation phase of the eDiscovery process initiated by tool A 302, the respective participant may query the blockchain 400 with tool B 304 for all available eDiscovery process that he has access to. The participant may thus seamlessly use the potential sources source1 . . . n identified by tool A 302 in order to perform the preservation.

Any update to the case that may be performed while the eDiscovery process is being worked on by tool B 304 may immediately be visible for tool B 304 checking blockchain 400. Thus, it may be prevented that the eDiscovery process is performed on meanwhile outdated electronic data objects.

Similar to tool A 302, tool B 304 may produce electronic data objects data(P2)1 . . . n, where each electronic data object maps to one electronic data objects comprised by sources source1 . . . N as a potential source. The data(P2)1 . . . n and its relation may be audited in blockchain 400 by tool B 304. As the electronic data objects data(P2)1 . . . n may have a large volume, it may be more efficient to just store metadata, like e.g. a unified resource identifier (URI), inside the blockchain which allows to identify and retrieve the respective electronic data objects data(P2)1 . . . n if needed. Furthermore, a hash and a signature of the respective electronic data objects data(P2)1 . . . n may be stored in blockchain 400.

Similar to tool A 302 and tool B 304, tool C 306 be configured, to invoke executable instructions comprised by the blockchain 400 to add audit information to the audit recorded by blockchain 400 for the present eDiscovery process, when an auditable action, like e.g. creation, modification or deflection, of an electronic data object associated with the eDiscovery process is performed in the context of tool C 306.

When the same or another participant wants to proceed with the eDiscovery process processing electronic data objects data(P2)1 . . . n preserved by tool B 304 using the potential sources source1 . . . n identified by tool B 302, the blockchain may allow for querying all electronic data objects that are associated with the present eDiscovery process to be worked on. Using the electronic data objects data(P2)1 . . . n preserved by tool B 304, tool C 306 may create a set of normalized electronic data objects data(P3)1 . . . m, with m≤n, reducing the amount of electronic data objects data(P2)1 . . . n to be further handled.

When an end-to-end audit trail for the eDiscovery process is to be produced, one of the tool 302-306 or another independent tool, may retrieve the end-to-end audit trail from blockchain 400. This allows a clear lineage from the potential sources source1 . . . n to the normalized electronic data objects data(P3)1 . . . m for each of the respective electronic data objects, providing tamper proof evidence that there is no normalized electronic data objects data(P3)1 . . . m missing. In case the audit trail indicates that one of the electronic data objects data(P2)1 . . . n processed by tool B 304 has not been imported into tool C 306 for normalization, it may become apparent that a normalized electronic data objects data(P3)1 . . . m may be missing. Also in case toll B 304 has not processed one of the potential sources source1 . . . n, e.g. because of internal errors in tool B 304 or because tool B 304 was using an outdated of the potential sources, this may easily become apparent from end-to-end audit trail.

Figure 4:
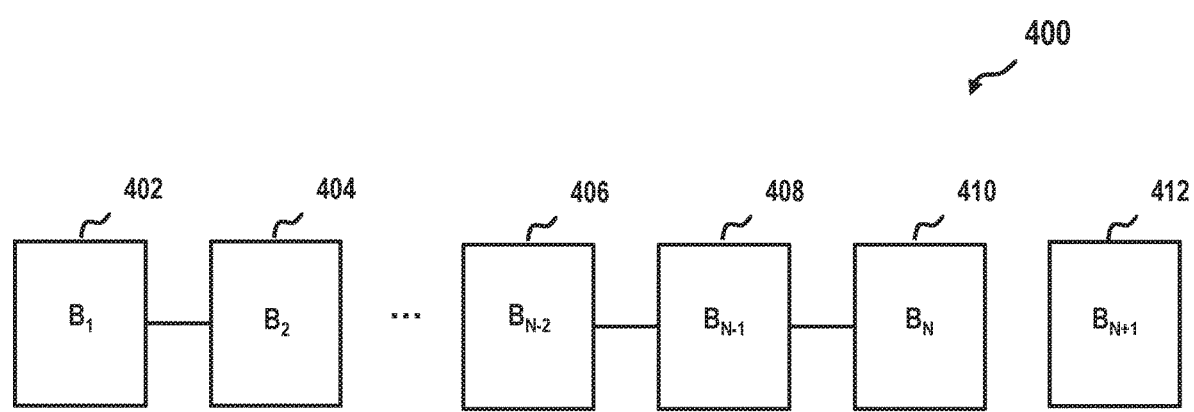
FIG. 4 depicts a schematic diagram of an exemplary blockchain.

FIG. 4 shows a schematic diagram of an exemplary blockchain 400 used for storing metadata, audit information and/or result of the different phases of the eDiscovery process. Blockchain 400 comprises a plurality of blocks $B_1$ to $B_N$ 402-410. Each block $B_2$ to $B_N$ 404-410 includes the hash of the prior block $B_1$ to $B_{N-1}$ 402-408 in the blockchain 400, thereby linking the two. In order to amend one of the blocks $B_1$ to $B_N$ 402-410, the hashes of all the following blocks would have the be amended as well. In case additional data is to be stored in the blockchain 400, an additional block $B_{N+1}$ 412 comprising the additional data is generated and added to blockchain 400 by linking it with the last block $B_N$ 410. Linking block $B_{N+1}$ 412 with block $B_N$ 410 may comprise adding the hash of block $B_N$ 410 to block $B_{N+1}$ 412. Blocks $B_1$ to $B_N$ 402-410 and in particular the first blocks of blockchain 400 may comprise computer-readable program code. An execution of the computer-readable program code by one of the electronic data processing tools may cause the respective electronic data processing tool to store metadata and audit information in blockchain 400.

According to embodiments, blockchain 400 may be a blockchain specifically initiated for a particular eDiscovery process. In this case, initiation data, like e.g. the scope of the eDiscovery process, may be stored in the first or second block $B_1$ or $B_2$ 402-404. According to embodiments, blockchain 400 may be configured to record a plurality of eDiscovery processes. In this case, the initiation data would be stored at the end of the blockchain 400 as it is at the time of initiation of the eDiscovery process. Confidentiality of the different eDiscovery processes comprised by the same blockchain 400 may be implemented by restricting the read access to the data stored in the blocks $B_1$ to $B_N$ 402-410 of blockchain 400 exclusively to the participants or a selection from the participants of the eDiscovery processes, the respective stored data belongs to. Such a restriction of read access may e.g. be implemented by encrypting the data stored in blockchain 400 with different encryption keys depending on the eDiscovery processes, the respective stored data belongs to.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for performing an electronic discovery process for providing evidence in form of electronic data objects using a blockchain, the electronic discovery process comprising a plurality of phases and for at least two of the phases individual electronic data processing tools being used for executing the respective phase, each of the individual electronic data processing tools being dedicated to an individual one of the at least two phases, the method comprising for each of the phases of the electronic discovery process:

storing metadata of the electronic data objects being subject to the respective phase of the electronic discovery process and to the electronic data processing tool used for executing the respective phase in the blockchain, storing audit information about auditable actions carried out during the respective phase by the electronic data processing tool used for executing the respective phase on the electronic data objects in the blockchain, the stored audit information providing an end-to-end audit trail for each of the electronic data objects subject to at least one of the phases of the electronic discovery process.

2. The method of claim 1, for each of the electronic data processing tools the method further comprising: storing results of the execution of the respective electronic data processing tools in the blockchain.

3. The method of claim 2, the storing of the results comprising storing resulting electronic data objects or references to the respective resulting electronic data objects in the blockchain.

4. The method of claim 2, the method further comprising for each phase of the electronic discovery process preceded by another one of the phases of the electronic discovery process accessing at the beginning of the respective phase the results of the respective preceding phase provided in the blockchain.

5. The method of claim 1, the blockchain providing a data processing lineage for each of the electronic data objects.

6. The method of claim 1, using for each of the phases of the electronic discovery process an individual electronic data processing tool and each of the electronic data processing tools being dedicated to an individual one of the phases.

7. The method of claim 1, the blockchain comprising computer-readable program code, execution of the computer-readable program code by one of the individual electronic data processing tools causing the individual electronic data processing tool to store the audit information about auditable actions carried out by the respective individual electronic data processing tool in the blockchain.

8. The method of claim 1, each of the electronic data processing tool while being executed checking the blockchain for new entries.

9. The method of claim 8, the access to the electronic data object via the download address being cryptographically restricted.

10. The method of claim 1, further comprising:
determining a requirement for a cross-electronic data processing tool notification based on auditable actions documented in the blockchain,
in response to determining the respective requirement, initiating the cross-electronic data processing tool notification.

11. The method of claim 1, the metadata of the electronic data objects stored in the blockchain comprising at least one of the following: name, hash, signature and locator of the respective electronic data object.

12. The method of claim 1, the metadata further comprising a download address from which the respective electronic data object can be downloaded.

13. The method of claim 1, the audit information about auditable actions carried out on the electronic data objects comprising at least one of the following: creation, modification, and deletion of the respective electronic data object.

14. The method of claim 1, the electronic data objects comprising at least one of the following: email, instant message, text document, drawing, graph, chart, photograph, sound recording, video recording.

15. The method of claim 1, read access to data and information assigned to a group of the electronic data objects and stored in the blockchain being cryptographically restricted.

16. The method of claim 1, the blockchain comprising a definition of the scope of the electronic discovery process, an amendment of the scope of the electronic discovery requiring an approval by each of the parties involved in the electronic discovery process.

17. The method of claim 1, the electronic discovery process comprising the phases of identification, preservation, collection, processing, review, analysis, and production of the electronic data objects.

18. The method of claim 1, the blockchain being distributed over a plurality of computer systems of participants of the electronic discovery process, each of the computer systems storing a copy of the blockchain.

19. A computer program product comprising a non-volatile computer-readable storage medium having computer-readable program code embodied therewith, the computer-readable program code being configured to implement the following for each phase of an electronic discovery process for providing evidence in form of electronic data objects using a blockchain, the electronic discovery process comprising a plurality of the phases and for at least two of the phases individual electronic data processing tools being used for executing the respective phase, each of the individual electronic data processing tools being dedicated to an individual one of the at least two phases, when being executed by a computer system:
storing metadata of the electronic data objects being subject to the respective phase of the electronic discovery process and to the electronic data processing tool used for executing the respective phase in the blockchain,
storing audit information about auditable actions carried out during the respective phase by the electronic data processing tool used for executing the respective phase on the electronic data objects in the blockchain,
the stored audit information providing an end-to-end audit trail for each of the electronic data objects subject to at least one of the phases of the electronic discovery process.

20. A computer system for performing an electronic discovery process for providing evidence in form of electronic data objects using a blockchain, the electronic discovery process comprising a plurality of phases and for at least two of the phases individual electronic data processing tools being used for executing the respective phase, each of the individual electronic data processing tools being dedicated to an individual one of the at least two phases, the computer system being configured for each of the phases of the electronic discovery process to:
store metadata of the electronic data objects being subject to the respective phase of the electronic discovery process and to the electronic data processing tool used for executing the respective phase in the blockchain,
store audit information about auditable actions carried out during the respective phase by the electronic data processing tool used for executing the respective phase on the electronic data objects in the blockchain,
the stored audit information providing an end-to-end audit trail for each of the electronic data objects subject to at least one of the phases of the electronic discovery process.

* * * * *